L. J. HELGESON.
CHECK ROW PLANTER.
APPLICATION FILED FEB. 21, 1913.
1,084,432.
Patented Jan. 13, 1914.
3 SHEETS—SHEET 1.
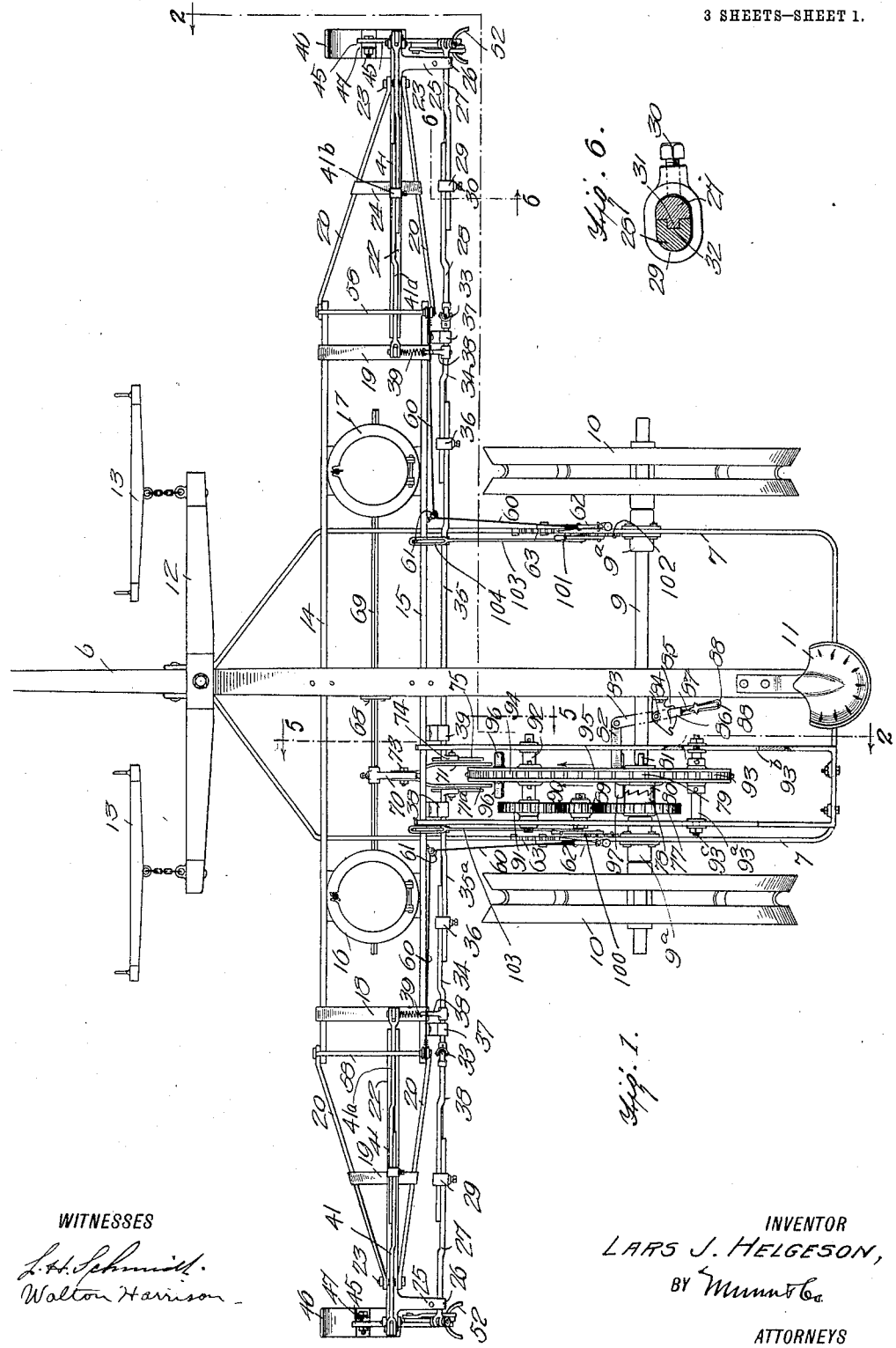
WITNESSES
INVENTOR
LARS J. HELGESON,
BY
ATTORNEYS

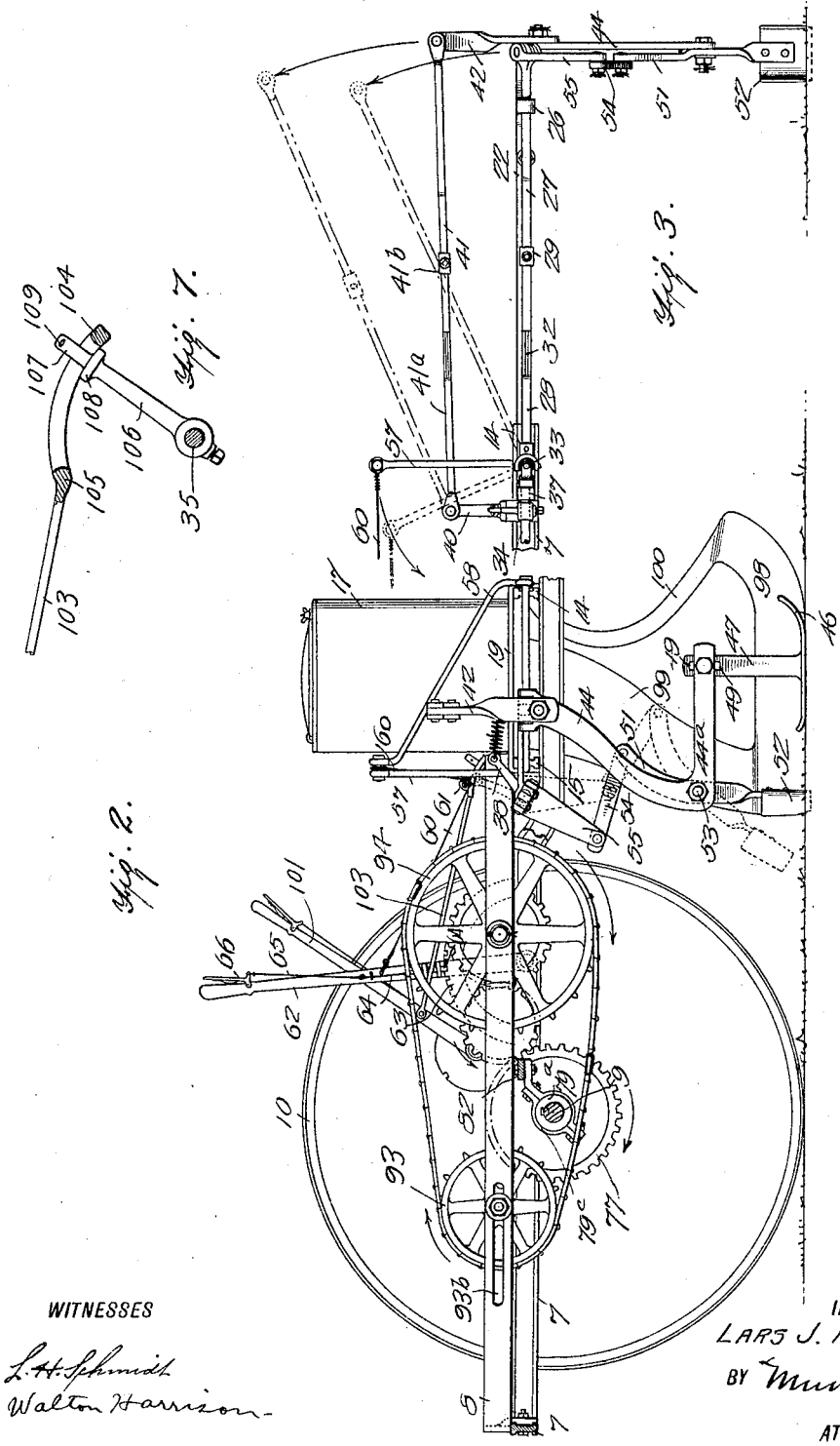

L. J. HELGESON.
CHECK ROW PLANTER.
APPLICATION FILED FEB. 21, 1913.
1,084,432.
Patented Jan. 13, 1914.
3 SHEETS—SHEET 3.
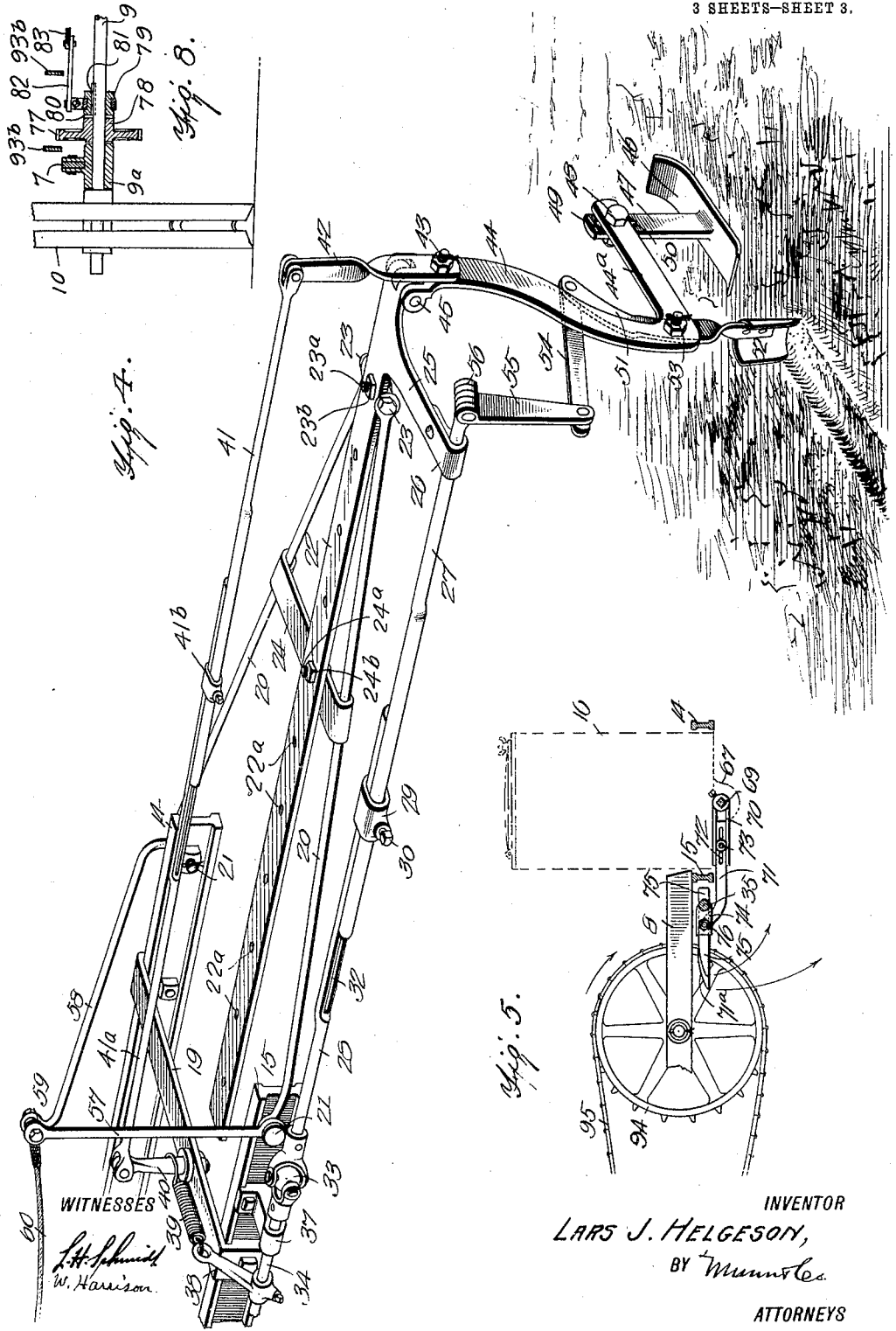
INVENTOR
LARS J. HELGESON,
BY Munn&Co.
ATTORNEYS

UNITED STATES PATENT OFFICE.

LARS J. HELGESON, OF FISHER, MINNESOTA.

CHECK-ROW PLANTER.

1,084,432. Specification of Letters Patent. Patented Jan. 13, 1914.

Application filed February 21, 1913. Serial No. 749,856.

*To all whom it may concern:*

Be it known that I, LARS J. HELGESON, a citizen of the United States, and a resident of Fisher, in the county of Polk and State of Minnesota, have made certain new and useful Improvements in Check-Row Planters, of which the following is a specification.

My invention relates to check row planters of a type suitable for planting corn and seeds of various kinds, and also for dropping charges of fertilizer.

More particularly stated, my invention comprehends a type of check row planter provided with marking attachments located upon its opposite sides, and each adapted to be thrown into or out of action independently of the other, at the will of the operator.

My invention further comprehends a number of improvements for increasing the efficiency of the planter and the marking attachments.

Reference is made to the accompanying drawing forming a part of this specification, and in which like letters indicate like parts.

Figure 1 is a plan view of the device complete. Fig. 2 is a section on the line 2—2 in Fig. 1, looking in the direction of the arrow. Fig. 3 is a fragmentary rear elevation showing one of the marking attachments. Fig. 4 is a perspective of one of the marking attachments. Fig. 5 is a fragmentary section on the line 5—5 of Fig. 1, looking in the direction of the arrow and showing a part of the tripping mechanism for actuating the markers. Fig. 6 is an enlarged fragmentary section on line 6—6 of Fig. 1, looking in the direction of the arrow. Fig. 7 is a detail showing in section a part of the mechanism for throwing out of action, the markers and parts immediately associated therewith. Fig. 8 is a detail showing a section on the line 8—8 of Fig. 1, looking in the direction of the arrow.

The central frame member or tongue of the machine is shown at 6, and connected with it is a metallic frame 7, serving to some extent the purpose of a vehicle frame. Mounted upon the vehicle frame is a gearing frame 8.

The axis of the planter is shown at 9. It is revoluble and carries two ground wheels 10 for supporting the weight of the various other parts. The axle 9 extends through bearings $9^a$ carried by the frame 7. The driver's seat is shown at 11, a double tree at 12 and a pair of swingle trees at 13, these parts being of the usual or any desired construction.

Mounted upon the frame 7 and extending across the top thereof are two I-beams 14, 15 and supported between these I-beams are two hoppers 16, 17, for holding the material to be planted or deposited. Braces 18, 19, extend from the I-beams 14 to the I-beam 15 for the purpose of holding these parts rigid. Located at the ends of the I-beams 15, 16 are bars 20, the latter being pivotally connected to the I-beams 14, 15 by pivot pins 21. A flat bar 22 is located between the bars 20 and is secured to the latter by a bolt 23, which is provided with a threaded stud $23^a$ extending laterally from it, and upon this stud is fitted a clamping nut $23^b$, as will be understood from Fig. 4. The bar 22 is provided with a number of holes $22^a$ spaced apart, and each adapted to receive a bolt $24^a$, which normally extends through a hole in the brace 24. Connecting the bars 20 is a brace 24 having the form of a flat bar bent at its ends to encircle the bars 20. The flat bar 22 is provided with an arm 25 integral with it and extending rearwardly from it, as shown in Fig. 4. This arm 25 carries a bearing 26 through which extends a shaft section 27. Adjacent to this shaft section, and partially overlapping the same, is another shaft section 28. A band 29 encircles the overlapping portions of both of these sections, and by aid of a set screw 30, clamps them together. The shaft section 27 is provided with a tongue 31 (see Fig. 6) which fits into a groove 32 with which the shaft section 28 is provided. The two shaft sections 27, 28, are thus telescopically connected, and by loosening the bolt 30, may be moved relatively to each other, and then again clamped by turning the bolt 30. The shaft sections 27, 28 are thus rendered adjustable as to their aggregate length.

The shaft section 28 is connected with another shaft section 34 by a universal joint 33, and the shaft section 34 is connected with another shaft section 35 by a clamping band 36, similar to the band 29. The shaft sections 34, 35 are thus rendered telescopically adjustable in like manner as the shaft sections 27, 28, as above described. The I-beam 15 is provided adjacent to its ends with bearings 37 which support the shaft sections 34. Mounted upon each shaft section 34 is an arm 38, the form of which may readily be seen by reference to Fig. 4. A spiral spring 39 is connected with this arm and with a post 40, the latter being mounted upon the brace 19. Pivotally mounted upon the post 40 is a guide bar made of two sections 41, 41$^a$, secured together by a band 41$^b$, so that this guide bar is rendered extensible, as will be understood from Fig. 4. The section 41$^a$ of this guide bar is pivotally connected to an arm 42. This arm is, by aid of a bolt 43, secured to a larger arm 44. The arm 44 is connected at its upper end to the flat bar 42 by a pivot 45 and extends downwardly from this pivot. The arm 44 is provided with a forwardly extending portion 44$^a$ integral with it. A sliding shoe 46 is adapted to engage the ground and is provided with a centrally disposed stem 47 extending upwardly. This stem is provided with holes 49, 50. By aid of a bolt 48 extending through some one of these holes, and through a corresponding hole in the portions 44$^a$ of the arm 44, the stem 47 may be secured rigidly to the portion 44$^a$. By removing the bolt 48, adjusting the stem 47 and bringing the bolt into registry with different holes 49, 50, and then replacing the bolt the sliding shoe 46 may be adjusted to different levels relative to the portion 44$^a$ of the arm 44.

By removing the nuts 23$^b$, 24$^b$, the bar 22 may be moved in the general direction of its length relatively to the brace 24 and to the bolt 23, so that the bolt 24$^a$ and the stud 23$^a$ may be thrust through holes 22$^a$, these holes being different from those through which the same parts first extended. Then by replacing the nuts 23$^b$, 24$^b$, the bar 22 is held in its new position. In order to move the bar 22, however, it is necessary to disconnect the shaft sections 27, 28, which is done by loosening the clamp bands 29.
The two sections 41, 41$^a$, constituting the guide bar, are also disconnected by loosening band 41$^b$. After the bar 22 is thus adjusted, or placed in its new position, the shaft sections 27, 28, are again connected by clamping the band 29 upon them, and the two sections 41, 41$^a$ of the guide bar are similarly connected by clamping the band 41$^b$ rigidly upon them.

A lever 51 carries at its lower end a hoe 52, and by aid of a pivot pin 53 is journaled to rock upon the arm 44. A pitman 54 is pivotally connected with the upper end of the lever 51 and is also pivotally connected with the lower end of a crank 55.
This crank is connected by a pivot pin 56 with the adjacent end of the shaft section 27. The hoe 52 is swung or rocked into different angular positions relatively to the arm 44 by rocking movement of the shaft section 27 and through shaft sections connected therewith, as above described.

An arm 57 is pivotally mounted at its lower end upon a pin 20 and is connected at its top by a bolt 59 with a bar 58, this bar at its opposite end being pivotally connected with the pin 21. The arm 57 and the bar 58 are so connected with the adjacent parts 20 that when rocked upon the pivot pins 21, the rods 20 are raised or lowered at their outer ends and therefore swing upon these pivot pins as centers. The pivot pins 21 are in direct alinement with each other, and with the center of the universal joint 33. A cord 60 is connected with the bolt 59 and engages a pulley 61. Secured to the cord 60 is a hand lever 62 which is mounted to swing upon the frame 7. Disposed adjacent to the hand lever 62 and mounted rigidly upon the frame 7, is a toothed sector 63.

The hand lever carries a pawl 64 for engaging the teeth of the sector and thus holds the hand lever in any one of a number of angular positions into which it may be moved. Connected with the pawl 64 is a rod 65 which is pivotally connected with a rocking handle 66 carried by the hand lever. The operator by moving the handle 66 may raise the pawl 64 out of engagement with the sector 63 and may then swing the hand lever 62 into any desired angular position and by releasing the handle 66 the pawl again engages the sector and thus holds the hand lever 62 in position in which it is thus set. It will be understood that there are two of these hand levers located upon opposite sides of the frame 7 and that the various parts controllable by these levers are made substantial duplicates of each other.

Located parallel with the I-beams 14, 15, and slightly below the level thereof, is a rocking shaft 69. This rocking shaft extends through a bearing 68 and is connected to the seed droppers, one of which is shown at 67 in Fig. 5, these seed droppers being located at the lower ends of the seed hoppers 16, 17, and being of the usual or any desider construction.

Mounted rigidly upon the rocking shaft 69 is a crank 70. An arm 71 engages this crank and is provided with a rounded surface 71$^a$ serving as a surface upon which the trippers may press, as hereinafter described. The arm 71 is provided with a slot 72, and extending through this slot and through the crank 70 is a bolt 73. By loosening this bolt the arm 71 may be moved toward or from the rocking shaft 69, and then by tightening the bolt 73, may be clamped in the new position thus assumed.

In this way the distance from the rounded surface 71ª to the rocking shaft 69 may be varied within suitable limits.

Mounted rigidly upon the shaft section 35 is a crank 74, shown more particularly in Fig. 5. Connected with this crank by a bolt 76 is an arm 75 which is adapted to be tripped in order to rock the shaft section 35. The arm 71 is somewhat longer than the arm 75.

Mounted loosely upon the axle 9 is a gear wheel 77 which is provided with a hub 78, the latter being formed into a clutch member. A clutch head is shown at 79 and is provided with a hub 80 formed into a clutch face. The clutch head 79 and its clutch face 80, by aid of a spline 81 are connected with the axle 9 and are revoluble therewith, while at the same time adapted to be moved bodily in the general direction of the length of the axle. The clutch head 79 is further provided with an annular bead 79ª and by aid of the latter a two-part collar 79ᶜ is connected with the gear wheel 79. The collar 79ᶜ is secured to a link 82, the latter being pivotally connected to a hand lever 83. This hand lever works upon a pivot pin 84 and is disposed adjacent to sector 85. The hand lever 83 is provided with a guard 86 which slightly overhangs the sector 85. The hand lever 83 carries a pawl 87 for engaging the sector 85 in order to hold the hand lever 83 in different angular positions into which it may be shifted. A handle 88 is connected with the pawl 87 for controlling the engagement of the pawl with the sector.

The operator sitting upon the driver's seat 11 by removing the hand lever 83 to his right or left, can bring the clutch face 80 into or out of engagement with the mating clutch face 78, and in so doing may bring the gear wheel 77 into or out of the operative control of the revoluble axle 9. Meshing with the gear wheel 77 is an idle pinion 89. Meshing with this idle pinion is a gear wheel 91 which is keyed upon a revoluble shaft 92, the latter being journaled in the gearing frame 8. Another shaft 93ª is journaled in this gearing frame and carries a sprocket wheel 93. Secured rigidly upon the revoluble shaft 92 is a sprocket wheel 94. A sprocket chain 95 engages the sprocket wheels 93 and 94. The length of this sprocket chain may be changed by adding or removing some of its links and the length of the chain may thus be rendered adjustable. To facilitate this purpose I provide the gearing frame 8 with slots 93ᵇ in which the shaft 93ª is adjustably secured. By moving the shaft 93ª forward or backward within the slots 93ᵇ, any suitable length of chain may be accommodated. Carried by the sprocket chain 95 are plates 96, 96, arranged in pairs as shown in Fig. 1, the plates of each pair extending in opposite directions from the chain. These plates I designate as trippers. They are used for the purpose of depressing the arms 75, 71, as the chain is actuated. By varying the length of the chain, as above described, the trippers 96 may be spaced greater distances along the chain relatively to the trippers 97. In this way the number of depressions of the arms 75, 71, made by the trippers during the action of the machine, may be varied relatively to the number of turns made by the ground wheels 10.

The arms 71, 75 and parts adjacent to them, are duplicated upon opposite sides of the sprocket chain 95. The shaft section 35ª upon one side of the sprocket chain is shorter than the corresponding shaft section 35, because the gearing frame 8 is located to the left of the driver's seat, as will be understood from Fig. 1. The furrow opener is shown at 98, the seed chute at 99, and the braces for the furrow chute at 100. These parts may be of the usual or any desired construction.

Journaled upon the metallic frame 7 are two hand levers 101, each associated with a sector 102. Pivotally connected with each hand lever 101 is a bar 103 provided with a link 104, this link having a general arcuate form and being provided with a slot 105, as will be understood from Fig. 7. Each shaft section 35—35ª carries an arm 106 secured rigidly upon it, as will be understood from Fig. 5. The arm 106 is provided with a neck 107 extending through the slot 105, and is further provided with an enlarged portion 108 serving as a bearing upon which the link 104 is adapted to rest.

Whenever the hand lever is swung backwardly, the rod 103 carries the link 104 backward, and in so doing the arm 106 is turned so that the shaft section 35 or 35ª is rocked slightly in a contra-clockwise direction, according to Fig. 5. The tripping mechanism is thus thrown out of action for the reason that the tripping plates carried by the chain 95 can no longer be brought into engagement with the arms 75. The operator may therefore, at will prevent the tripper from rocking either of the shaft sections 35, 35ª, and parts controllable by the same. By doing this he throws either of the marking mechanisms as a whole out of action.

The operation of my device is as follows: I will assume first that the machine is in condition to be carried to the field. For this purpose the hand levers 62 are thrown backwardly so that the sliding shoe 46 and hoes 52 are raised into their uppermost positions. The hand lever 83 is moved into such position that the clutch member 80 is out of engagement with the clutch member 78. As the machine is now drawn along after the manner of a vehicle by aid of the swingletrees 13, the wheels 10 simply turn and the various working parts are not actuated. The machine having arrived at the field where the planting is to be done, it may happen that the operator wishes to plant the rows, and while planting each row to mark or check the next successive row, in order that the seeds, when planted, are properly checked or spaced apart. As he drives along a particular row, the next successive row to be marked may be either at his right or at his left. If the marking is to be done upon the right hand side of the row he is planting he releases the hand lever 62 at his right. If, however, the marking is to be done upon the side of the machine corresponding with his left, he lowers the hand lever 62 at his left. After reaching the end of the row, and turning the machine around, he so handles the levers 62, or either of them, that the side of the machine which is to do the marking is rendered active, the opposite side of the machine being maintained, for the time being, idle. In order to plant the row he shifts the hand lever 83 into such position that the clutch member 80 engages the clutch member 78, which is being done as the machine is drawn ahead by horses. Rotation of the axle 9, due to the rotation of the wheels 10, causes the gear wheel 77 to turn, and the idle wheel 89 and the gear wheel 91 are thus rotated. The sprocket gear wheels 93, 94, carrying the sprocket chain 95, are thus driven and the trippers 96, 97 periodically engage the arms 71, 75. The tripping of the arms 75 causes the rocking of the shaft sections 35, 34, together with the various other shaft sections 27, 28. These shaft sections in their entirety act practically as unitary rocking shafts, which are in alinement with each other.

Assuming that the marking mechanism at the left hand side of the machine is idle, the action of the marking mechanism at the right hand side may be understood from Figs. 1, 3 and 4. The sliding shoe 46 glides along over the surface of the ground. The hoe 52 normally scrapes upon the surface of the ground, as indicated in Fig. 4, thus making a distinct light mark. Each time the trippers 96, 97 cause the composite set of shaft sections 34, 28 and 27 to rock, the lever 51 is tilted and the marking hoe 52 is swung out of engagement with the ground. The marking attachment therefore makes a mark which is almost continuous, its intermissions being comparatively short—that is, intermissions representing the spots where the seeds are to be planted. The end of the row being reached and the hand lever 62 being drawn backwardly as above explained, the pull thus given upon the cord 60 raises the entire outer or free end of the marking mechanism so that the shoe 52, the sliding shoe 46 and various other parts are swung directly upward upon the pivot pins 21 considered as centers. The universal joint 33 enables the composite rocking shaft to bend for this purpose.

In the same instance the operator may desire to plant two rows at a time and to mark two other rows at a time. He may do this by planting two rows, skipping two rows and then planting two rows beyond the skip and then coming back and planting the two rows skipped. By doing this he can leave both hand levers 62 in their forward positions while the machine is planting the seeds.

I do not limit myself to the precise construction shown, as variations may be made therein without departing from the spirit of my invention.

I claim:—

1. The combination of a planter mounted upon wheels and adapted to be drawn by horses, a frame work extending across said planter, swinging frames pivotally connected with the opposite ends of said frame work, sliding shoes connected with said swinging frames for supporting the same, said sliding shoes being adapted to glide over the ground, a marking hoe located adjacent to each sliding shoe, mechanism for tilting said marking hoe to different angles in order to enable said marking hoe to engage and disengage the ground and means connected with said mechanism and controllable by the travel of the machine over ground for the purpose of actuating said mechanism.

2. The combination of a planter mounted upon wheels and adapted to be drawn over the ground, a frame work extending across said planter, swinging frames pivotally connected with the opposite ends of said frame work, sliding shoes connected with said swinging frames for supporting the same and adapted to glide over the ground, a marking hoe located adjacent to each sliding shoe, mechanism for tilting said marking hoe to different angles in order to enable said marking hoe to engage and disengage the ground, means controllable by the travel of the machine over ground for actuating said mechanism, and mechanism controllable at the will of the operator for adjusting the general position of each marking hoe relatively to the planter in order to adapt the machine for planting rows spaced apart by different distances.

3. The combination of a planter mounted upon wheels and adapted to be drawn over the ground, a frame work extending across said planter, swinging frames pivotally connected with the opposite ends of said frame work, sliding shoes connected with said swinging frames for supporting the same, said sliding shoes being adapted to glide over the ground, means for adjusting said swinging frames relatively to said frame work, a marking hoe located adjacent to each sliding shoe a lever mechanism for actuating the same, a rocking shaft connected with said lever mechanism and made in sections telescopically assembled for the purpose of rendering said shaft adjustable as to its length, and means controllable by forward movement of the planter for periodically actuating said shaft.

LARS J. HELGESON.

Witnesses:
NELS PETERSON,
OLE GUNSTENSON.

Copies of this patent may be obtained for five cents each, by addressing the "Commissioner of Patents, Washington, D. C."